United States Patent
Rhyne et al.

(10) Patent No.: US 7,044,180 B2
(45) Date of Patent: May 16, 2006

(54) RUN-FLAT INSERT FOR TIRES

(75) Inventors: Timothy B. Rhyne, Greenville, SC (US); Kenneth W. Demino, Anderson, SC (US); Steven M. Cron, Simpsonville, SC (US)

(73) Assignee: Michelin Recherche et Technique S.A., (CH)

( * ) Notice: Subject to any disclaimer, the term of this patent is extended or adjusted under 35 U.S.C. 154(b) by 0 days.

(21) Appl. No.: 10/757,065

(22) Filed: Jan. 14, 2004

(65) Prior Publication Data

US 2004/0140032 A1 Jul. 22, 2004

Related U.S. Application Data

(63) Continuation of application No. PCT/US01/23163, filed on Jul. 19, 2001.

(51) Int. Cl.
*B60C 17/04* (2006.01)
*B60C 17/06* (2006.01)

(52) U.S. Cl. ........................ 152/158; 152/520
(58) Field of Classification Search ................ 152/158, 152/520
See application file for complete search history.

(56) References Cited

U.S. PATENT DOCUMENTS

| 4,153,095 A | * | 5/1979 | Sarkissian | |
| 6,769,465 B1 | * | 8/2004 | Rhyne et al. | 152/197 |
| 2003/0121581 A1 | * | 7/2003 | Thompson et al. | 152/301 |
| 2004/0187996 A1 | * | 9/2004 | Grah | 152/516 |

* cited by examiner

*Primary Examiner*—Adrienne C. Johnstone
(74) *Attorney, Agent, or Firm*—E. Martin Remick; Frank J. Campigot; Adam Arnold (57) ABSTRACT

A run-flat insert 200 for enabling a vehicle to run for limited duration on a deflated tire 20, is mounted in an assembly comprising a pneumatic tire 20 and a wheel rim 10, and said insert is mounted inside the tire and secured to the wheel rim. The insert 200 has improved characteristics in load carrying, vehicle handling, mass, and shock transmission. Such a run-flat insert 200 comprises an outer, reinforced annular band 220 that is coupled with a sidewall portion 230 having little resistance to compressive loads, and the sidewall portion 230 tell mates in a base member 240 fitted around the wheel rim 10 for securing the insert 200 to the rim 10.

27 Claims, 7 Drawing Sheets

INVENTION

REFERENCE

RUN-FLAT INSERT FOR TIRES

CROSS-REFERENCE TO RELATED APPLICATIONS

This application is a continuation of International Application No. PCT/US01/23163, filed 19 Jul. 2001 and published 30 Jan. 2003 in English as International Publication No. WO 03/008209 A1.

BACKGROUND OF THE INVENTION

The present invention relates to a run-flat insert for mounting on a wheel rim and inside a pneumatic tire. In case of loss of inflation pressure from the tire, the insert is capable of taking up the vehicle loads. In particular this invention provides improved performance in load carrying, vehicle handling, and mass.

Many solutions have been proposed to provide continued vehicle mobility after loss of inflation pressure in a pneumatic tire. One class of solutions involves fixing a rigid or semi-rigid insert to the wheel rim and inside the tire. Upon loss of inflation pressure, the vehicle is supported by load transmission from the portion of the insert contacting the inside of the tire directly through the insert structure to the wheel rim. This solution has limited capability to absorb sharp load inputs from the road, thereby operationally limiting the usefulness of the insert. A solution having a structurally supported run-flat insert that delivers pneumatic tire-like performance would be a welcome performance improvement.

SUMMARY OF THE INVENTION

The subject of the instant invention is a run-flat insert having improved characteristics in load carrying, vehicle handling, mass, and shock transmission, wherein an outer, reinforced annular band is coupled with a sidewall structure having little resistance to compressive loads. Such a run-flat insert for enabling a vehicle to run for limited duration on a deflated tire, is mounted in an assembly comprising a pneumatic tire and a wheel rim, and said insert is mounted inside the air cavity of the tire and secured to the wheel rim, said insert comprising:

a) an elastomeric outer contacting portion for contacting the interior surface of the tire during deflated operation of the tire, and b) a reinforced annular band disposed radially inward of said outer contacting portion, wherein said band comprises an elastomeric shear layer, at least a first membrane adhered to the radially inward extent of said elastomeric shear layer and at least a second membrane adhered to the radially outward extent of said elastomeric shear layer, and c) at least one sidewall portion extending radially inward from said contacting portion for connecting said annular band to a base member fitted around the wheel rim for securing said insert to the rim, and d) at least one carcass layer adhered to said annular band, and said carcass extending radially inward from said annular band and anchored in said base member.

When the vehicle tire deflates and/or the tire deflects sufficiently, the insert contacts the interior surface of the tire. The applied load flattens the annular band. The deformation of the band causes tensile forces to develop in that portion of the sidewall that is out of contact with the tire. The vehicle wheel effectively hangs from the annular band by the sidewall portions. The sidewall portion is essentially inextensible in tension, but has little resistance to compressive buckling. Conversely, in rigid or semi-rigid inserts, the inserts support the load by compression in the portion of insert in contact with the interior surface of the tire.

Run-flat inserts may be tightly fixed to the wheel rim or require the use of extra material or spacers to maintain proper lateral location of the insert on the rim. In the instant invention, the base member has a high resistance to rotation about a longitudinal axis. The base member may have monolithic cores comprising a generally rectangular cross-section having a width of about 5% of the section width of the insert, and the core has a height equal to about 50 percent of its width. Alternatively, the core may comprise one of several arrangements of reinforcing wires. When this base member structure is coupled with radially oriented sidewall portions, the insert has the advantage of maintaining a stable alignment on the rim and requires no additional internal spacers or reinforcements.

Performance of the insert improves when the sidewall portion is biased to buckle advantageously in an axially outward direction when subjected to compressive loading. In the instant invention the sidewall is biased by an elastomeric wedge positioned in the sidewall essentially mid way between the first membrane and the base member. The wedge forces a curvature in the profile of the carcass layer. When the wedge is combined with the proper thickness of rubber on the outside of the carcass layer, the invention obtains the desired result of a consistent outward buckling of the sidewall in the region contacting the tire.

A properly inflated pneumatic tire exerts a relatively uniform contact pressure against the road surface. When rigid or semi-rigid inserts deform under load to support the wheel, the contact pressure with the interior of the tire is non-uniform. However, the insert according to the invention, when deflected against the inside of a deflated tire, exhibits a relatively uniform contact pressure and a contact area similar to that of a pneumatic tire. This attribute exists when the ratio of the longitudinal tension and compression moduli of each of the membranes to the shear modulus of the shear layer is at least 100:1. That is to say that the membranes behave as essentially inextensible and deformation of the annular band is accommodated by shear strain in the elastomeric shear layer. The functional mechanism of the annular band is the same as that described in U.S. Pat. No. 6,769,465 B2, owned in common with the instant application. As described therein (see column 2, lines 23–44), the shear modulus of elasticity of the elastomeric shear layer is sufficiently lower than the tensile modulus of elasticity of the first and second membranes such that, under an externally applied load, the ground contacting tread portion deforms from essentially a circular shape to a flat shape while maintaining an essentially constant length of the membranes. The runflat insert of the invention functions as a non-pneumatic load carrying device.

Each membrane is comprised of a pair of biased cord-reinforced layers with the cords arranged at an angle of about 10 degrees to about 20 degrees with the centerline of the insert. The elastomeric shear layer will have a shear modulus of elasticity between about 3 MPa and about 20 MPa. The shear layer preferably has low level of hysteresis with tangent delta less than or equal to than about 0.1.

The invention permits the designer to adjust the effective contact pressure as a design parameter of the insert. The contact pressure is approximated by the product of the shear modulus of elasticity of the shear layer, times the radial thickness of the annular band, and divided by the radius of the outermost extent of the second membrane. This contact pressure will normally be in the range of about 2 bar to about 6 bar. A contact pressure of about 3 bar yields a good compromise between the size and mass of the insert and vehicle performance.

From the point of view of load capacity, the ideal insert may have a section width and a section height limited only by the requirement of non-contact with the tire during normal operation. In a preferred form of the invention, the insert has a section width between about 50% to about 70% of the tire section width, and a section height between about 40% to about 60% of the tire section height.

DESCRIPTION OF THE DRAWINGS

The invention will be better understood by reference to the following non-limiting examples illustrated in the attached figures. The intent of these figures is to illustrate the significant structural characteristics of the invention. The figures are not drawn to scale.

FIG. 1 shows the loaded assembly, with the tire in a deflated state.

DETAILED DESCRIPTION OF THE INVENTION

The invention and its several variations will be better appreciated from the following detailed description. The Figures and detailed description disclose several exemplary illustrations of particular variations of the invention as of the invention. One skilled in the art will recognize that particular elements of these variations may be selected or combined to yield still further examples within the spirit and scope of the invention.

The following nomenclature and definitions are common to all variations of the invention disclosed herein. Similar reference numbers are used throughout to describe the same element or material. Similar elements are not discussed in detail when disclosed in a subsequent variation of the invention.

Definitions of terms

"inner" or "inward" means toward the interior of the insert.

"outer" or "outward" mean towards the exterior of the insert.

"axial" refers to a direction that is parallel to the axis of rotation of the insert "radial" refers to a direction perpendicular to the axis of rotation of the tire.

"Modulus" of elastomeric materials means the tensile modulus of elasticity measured at 10 percent elongation.

"Modulus" of the membranes means the tensile modulus of elasticity at 1 percent elongation multiplied by the effective thickness of the membrane.

"Shear Modulus" of elastomeric materials means the shear modulus of elasticity and is defined equivalent to one-third the tensile modulus of elasticity measured at 10 percent elongation.

"Hysteresis" means the tangent delta measured at 100 degrees Celsius under a 30 Hz, 50 percent peak-to-peak dynamic shear strain.

Figure 1:
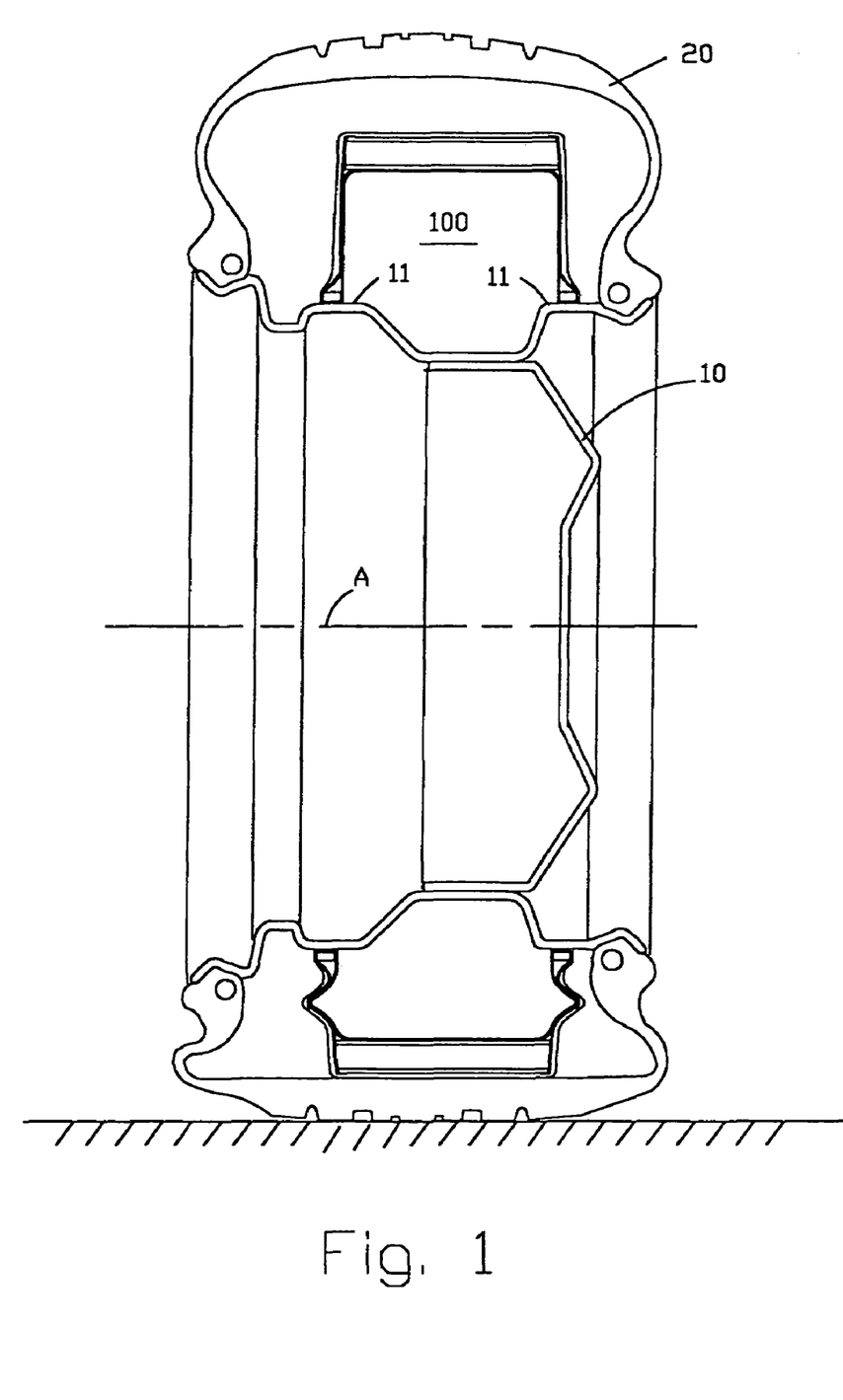
FIG. 1 shows a radial section of an assembly comprising the run-flat insert 100 mounted on a wheel rim and inside a tire.

FIG. 1 shows a run-flat insert 100 mounted as an assembly with specialized rim 10 and tire 20 for enabling a vehicle to run on a deflated tire. When the tire is fully inflated, the tire pneumatically supports the vehicle load, and the insert does not continuously contact the interior surface of the tire. However, as the inflation pressure of tire 20 decreases from normal operating conditions, the vertical deflection of tire 20 increases to the point where insert 100 contacts the inner surface of tire 20. FIG. 1 shows the operating condition with an uninflated tire where deformation of the run-flat insert 100 supports essentially the entire vehicle load. The fully deflated tire no longer provides significant load support, and the insert structurally supports the load.

Figure 2:
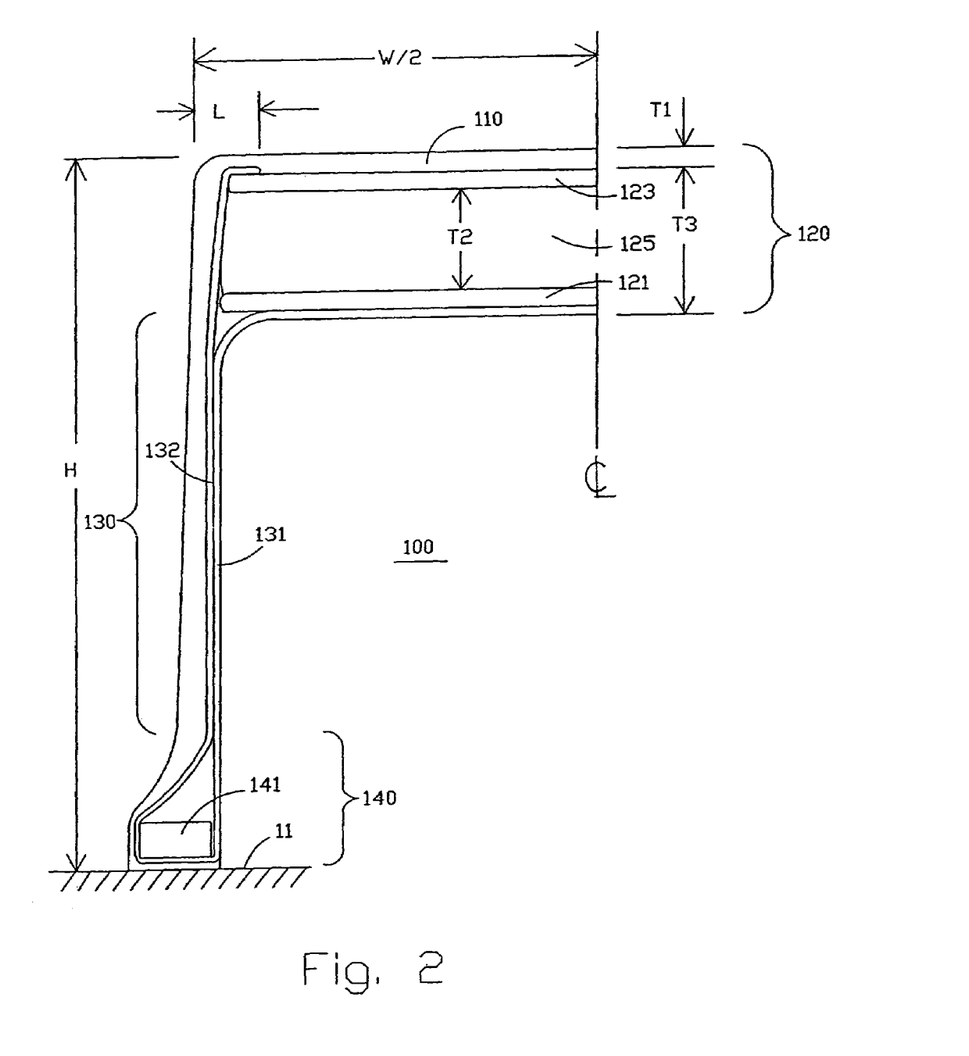
FIG. 2 shows a partial radial section of the run-flat insert 100 having a high turnup carcass that overlaps the second membrane.

FIG. 2 shows a more detailed view of the insert 100. Insert 100 has an overall section width W and a section height H; the latter defined as the distance between the mounting surface 11 of the wheel 10 and the outer contacting surface of the insert. Insert 100 has a sidewall height HS measured between the radially outward extent the bead core 141 and the radially interior surface of the insert. According to the variations of the invention disclosed herein, the radially outward extent of the sidewall height HS may correspond to either the carcass layer 131 or the first membrane 121. Sidewall thickness measurements are referenced to the axial direction. Thickness measurements for the outer contacting portion, membranes, and the shear layer are referenced to the radial direction. The outer contacting portion 110 has a thickness T1, shear layer 125 has a thickness T2, and the annular band comprising the shear layer and the first and second membranes has a thickness T3.

Insert 100 comprises the structure depicted in FIG. 2. An elastomeric outer contacting portion 110 provides the load-bearing surface for contact with the interior surface of the tire. A reinforced annular band 120 is disposed radially inward from the contacting portion 110. The reinforced annular band 120 comprises a first membrane 121 adhered to the inner surface of an elastomeric shear layer 125, and a second membrane 123 adhered to the outer surface of the elastomeric shear layer 125. Sidewall portion 130 extends radially inward from the contacting portion 110 and the annular band 120. A base member 140 containing bead cores 141 fits around the wheel rim surface 11 and secures the insert to the rim in both inflated and deflated operation.

Run-flat insert 100 further comprises a carcass layer having a main portion 131 that is adhered to the radially inner surface of the first membrane 121 and extending between the bead members 140. The carcass layer has a turned up portion 132 folded around the bead core 141. The flexural stiffness of the reinforced annular band 120 improves when the turned up portion 132 of the carcass is adhered to the axially outer face of the band. In the form of the invention corresponding to run-flat insert 100, the turned up portion 132 extends radially outward from the base member 140, adheres to the axially outer face of the band, and terminates in an axial overlap with the second membrane 123. This overlap facilitates fabrication of the insert on conventional tire building equipment. The overlap extends an axial distance L inward from the extremity of second membrane of about 10 mm. In other forms of the invention, the turned up portion 132 may terminate without overlap, at the axial extremity of the second membrane 123, or at some lower radial location within the sidewall 130 or bead member 140.

The tensile resistance of the carcass layer is sufficient when the linear stiffness per unit circumference, measured at the mid-height of the sidewall, of the carcass reinforcements and surrounding elastomeric layers is at least 100 daN/mm. In the run-flat insert 100, polyester cords comprise the reinforcement of the carcass layer 131, 132, but any material suitable as a tire reinforcement material may be used. In a non-pneumatic structure such as the run-flat inserts disclosed herein, the average tensile force in each of the carcass reinforcing cords is significantly lower than in an inflated, pneumatic tire. Therefore, as segments of the sidewall rotate in and out of the contact region, there is an increased likelihood that compressive stress will occur in the carcass layer. For this reason, the most advantageous choice for carcass reinforcement material is one with good resistance to cyclic compressive loading.

Figure 3:
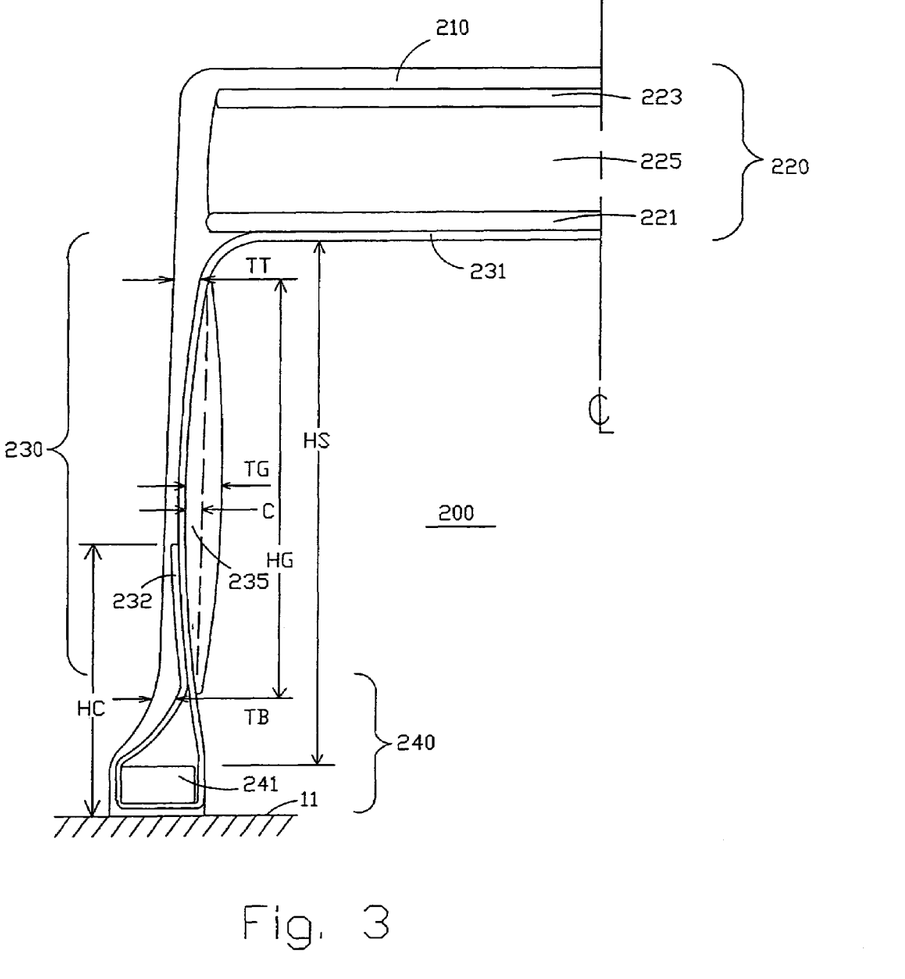
FIG. 3 shows a partial radial section of a run-flat insert 200 having a single carcass layer adhered to the first membrane and having a sidewall portion biased to buckle outward under compression.

Experimentation with the run-flat insert 100 has shown that elimination of the double layer carcass in the upper sidewall portion improves durability. FIG. 3 shows such an improved version of the invention. An elastomeric outer contacting portion 210 provides the load-bearing surface for contact with the interior surface of the tire. A reinforced annular band 220 is disposed radially inward from the contacting portion 210. The reinforced annular band 220 comprises a first membrane 221 adhered to the inner surface of an elastomeric shear layer 225, and a second membrane 223 adhered to the outer surface of the elastomeric shear layer 225. Sidewall portion 230 extends radially inward from the contacting portion 210 and the annular band 220. Base member 240 containing bead cores 241 fits around the wheel rim surface 11 and secures the insert to the rim in both inflated and deflated operation.

The inventors have recognized that the performance under cyclic stress of textile carcass materials improves when the carcass tension is maintained throughout each stress cycle. In a pneumatic tire, the inflation stress biases the carcass is in tension. In a non-pneumatic structure such as the run-flat inserts disclosed herein, no such tension bias exists. Therefore, durability of the insert improves when the deformation of the carcass layer in the portion of the insert loaded against the tire minimizes the tendency for the carcass to undergo cyclic compressive stress.

As a first means to achieve this performance improvement, run-flat insert 200 has only a single carcass layer in the upper sidewall portion. Run-flat insert 200 further comprises a carcass layer having a main portion 231 that is adhered to the radially inner surface of the first membrane 221 and extending between the bead members 240. The carcass layer has a turned up portion 232 folded around the bead core 241. The turned up portion 232 extends radially outward from the base member 140 and terminates a radial distance HC above the bead core 241. Run-flat insert 200 further improves durability by introducing a slight outward displacement C to the carcass layer 231. This displacement is assured by applying an extra elastomeric wedge 235 to the axially interior surface of carcass layer 231 and by proper specification of the sidewall thickness at the upper and lower extents of the wedge 235. Therefore, when the sidewall portion 230 experiences vertical compressive loads, the carcass is biased to buckle consistently in an axially outward direction. The effect of the wedge 235 and of the sidewall thickness serves to minimize the tendency of the carcass to experience cyclic compressive stress.

The wedge 235 has a height HG that is between about 50 percent to about 80 percent, and preferably about 65 percent, of the sidewall height HS. The wedge 235 is positioned approximately midway within the sidewall portion 230. The displacement C of carcass layer 231 is defined as the axial distance between the centerline of the carcass layer 231 and a chord connecting the upper and lower extents of the wedge 235. The displacement C is greater than zero and less than or equal to about 8 percent of the sidewall height. C is preferably about 5 percent of the sidewall height HS. The wedge 235 has an axial thickness TG that may be greater or less than the displacement C of carcass 231. TG is between about 4 percent and about 10 percent, and preferably about 7 percent, of the sidewall height HS. Thickness measurements TB and TT specify the thickness of the sidewall material to the exterior of the carcass. TB is measured at the radially innermost extent of the wedge 235. TT is measured at the radially outermost extents of the wedge 235. TB and TT are each between about 4 percent and about 10 percent, and preferably about 8 percent, of the sidewall height HS. Run-flat insert 200 was successfully constructed and evaluated using HS equal to 30 mm, C equal to 1.5 mm, HG equal to 20 mm, and TT, TB, and TG equal to 2 mm.

Figure 4:
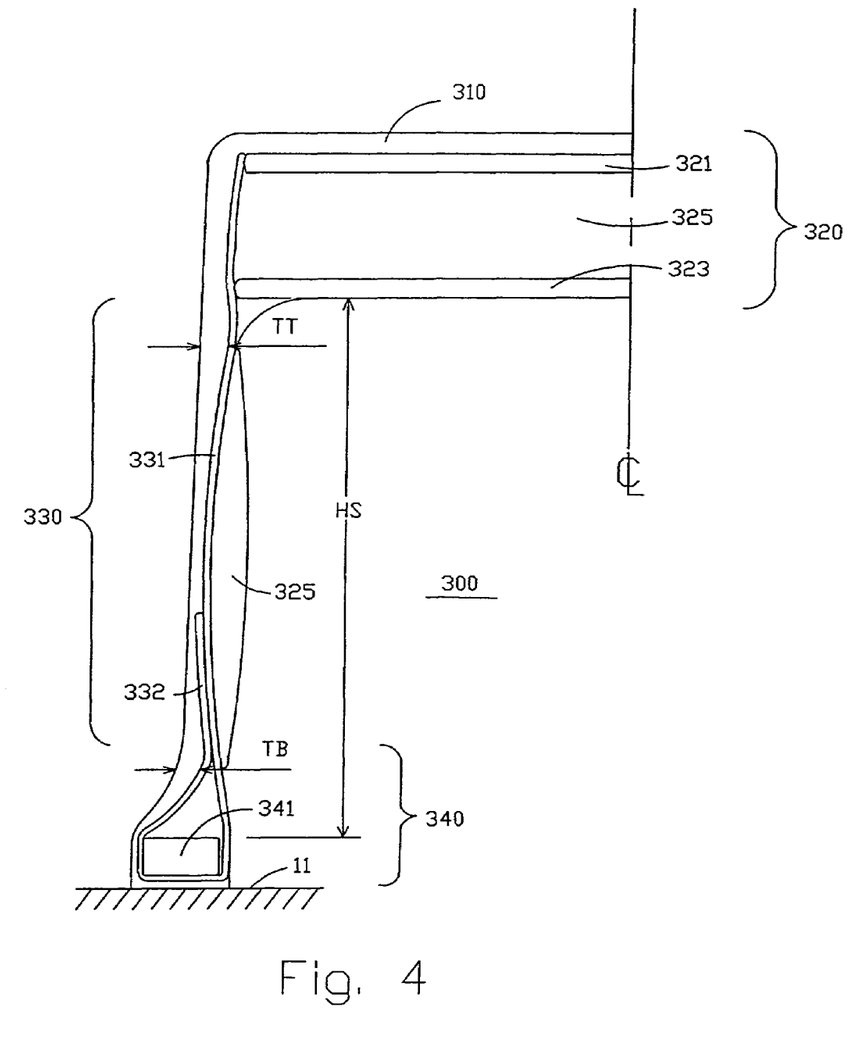
FIG. 4 shows a partial radial section of a run-flat insert 300 wherein the carcass layers are discontinuous segments adhered to the annular band and having a sidewall portion biased to buckle outward under compression.

FIG. 4 shows a version of the invention optimized for load carrying. That is to say, an insert having improved load/deflection stiffness. Run-flat insert 300 shares the structure of the reinforced annular band 325 common to run-flat inserts 100 and 200 previously disclosed. However, run-flat insert 300 has a unique carcass layer comprising at least a discontinuous carcass segment 331 anchored in the base member 340 and extending radially outward to the second membrane 321. The carcass segment 331 is adhered to an axially outermost extent of the reinforced annular band 320. That is to say, the carcass segment 331 extends radially outward at least to the axial extremity of the second membrane 321. As compared to run-flat insert 200 shown in FIG. 3, the carcass arrangement shown in FIG. 4 for run-flat insert 300 improves the load/deflection stiffness of the annular band 320. For ease of manufacturing, the carcass segment 331 may also overlap the second membrane 321 a distance L as previously described for the run-flat insert 100 shown in FIG. 2.

The following aspects of the detailed description of the invention are common to any of the variations 100, 200, or 300 of the insert. For simplicity, each structural element references insert 100, although this shortcut is not intended in any way to limit the scope of this disclosure.

The run-flat inserts of the invention have bead members with a high resistance to rotation about a longitudinal axis.

Figure 5:
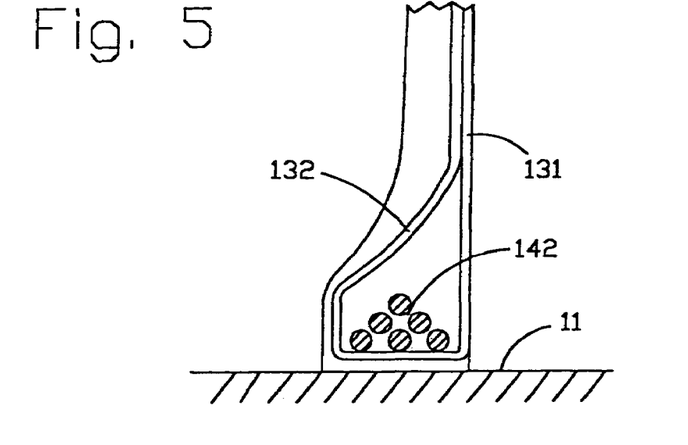
FIG. 5 shows a partial radial section of the base member of a run-flat insert having a 3-2-1 arrangement of adjacent reinforcing wires.
Figure 6:
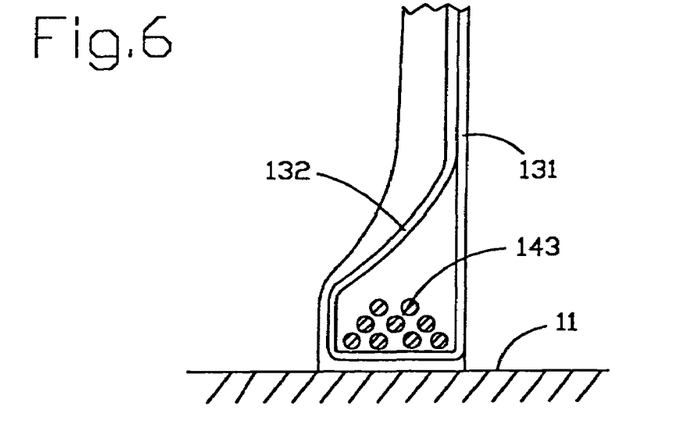
FIG. 6 shows a partial radial section of the base member of a run-flat insert having a 4-3-2 arrangement of adjacent reinforcing wires.
Figure 7:
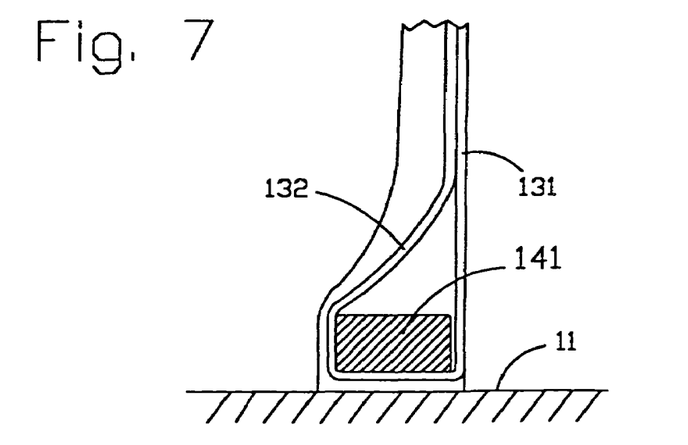
FIG. 7 shows a partial radial section of the base member of a run-flat insert having a monolithic reinforcement.

The resistance to rotation provides both stable axial alignment on the wheel surface 11 and good durability to flexure of the sidewall portions. FIGS. 5, 6, and 7 disclose three alternative arrangements of bead reinforcements. Any of the reinforcements 141, 142, or 143 apply to the variations of the insert 100, 200, or 300. FIGS. 5 and 6 show a typical arrangement consisting of a continuous winding of wire reinforcement. FIG. 5 shows a three layer arrangement 141 consisting of a winding of wire of about 1 mm and having a first layer of three wires, a second layer of two wires, and a third layer of one wire. The arrangement 142 of FIG. 6 provides a higher degree of bead rigidity and consists of a winding having a three-layer arrangement of four, then three, then two wires for the respective layers. FIG. 7 shows a preferred form having a monolithic reinforcement 143 of generally rectangular cross-section having a width of at least 4 mm and height of at least 2 mm. Reinforcement 143 has a width of about 5% of the section width of the insert, and a height equal to about 50 percent of its width. The bead members of the non-pneumatic insert may have a lower tensile modulus and tensile strength than required for a pneumatic structure. In the instant invention, suitable materials for bead reinforcements 141, 142, or 143 should have a tensile modulus of at least about 100 GPa and a tensile yield strength of at least about 10 GPa.

The run-flat inserts 100, 200, or 300 have an annular band comprising first and second membranes adhered to the elastomeric shear layer. The preferred deformation of the band occurs when the ratio of the longitudinal tensile modulus of each of the membranes to the shear modulus of the shear layer is at least 100:1. According to one form of the invention, the first and second membranes have longitudinally oriented cord reinforcements. Preferably, each membrane, 121 or 123, comprises at least two layers of mutually oblique cord reinforcements forming an angle with the tire circumferential direction of between about 10 degrees to about 20 degrees. Equation (1) below estimates the longitudinal tensile modulus of a membrane using conventional tire belt materials:

$$E'_{MEMBRANE} = (2D+t)\frac{E_{RUBBER}}{2(1-v^2)}\left[\left(\frac{P}{P-D}\right)\frac{2-(1+v)SIN^2(2\alpha)}{SIN^4\alpha} + \left(\frac{t}{D}\right)\frac{1}{TAN^2\alpha}\left(\frac{1}{TAN^2\alpha}-v\right)\right] \quad (1)$$

Where: $E_{rubber}$=Tensile modulus of the elastomeric coating material
P=Cord pace (cord centerline spacing) measured perpendicular to the cord direction
D=Cord diameter
$v$=Poisson's ratio for the elastomeric coating material
$\alpha$=Cord angle with respect to the equatorial plan
t=Rubber thickness between cables in adjacent layers
Note that E' is the elastic modulus of the membrane times the effective thickness of the membrane The elastomeric shear layer 125 preferably has a shear modulus of elasticity between about 3 MPa and about 20 MPa. The shear layer has a low hysteresis given by tangent delta less than or equal to about 0.1. Shear layer 125 has a thickness T2 between about 4 mm and about 20 mm.

An advantage of the instant invention is that the contact pressure during deflated operation between the insert and the tire is a design parameter that the designer may adjust. The contact pressure between the insert and the inside of the tire is given by the product of the shear modulus of elasticity of the shear layer times the radial thickness of the shear layer divided by the radius of the outermost extent of the second membrane. The insert delivers acceptable performance when the contact pressure is between about 2 bar and about 6 bar. In general, the contact pressure of the insert will be proportionately greater than the specified tire inflation pressure.

Figure 8:
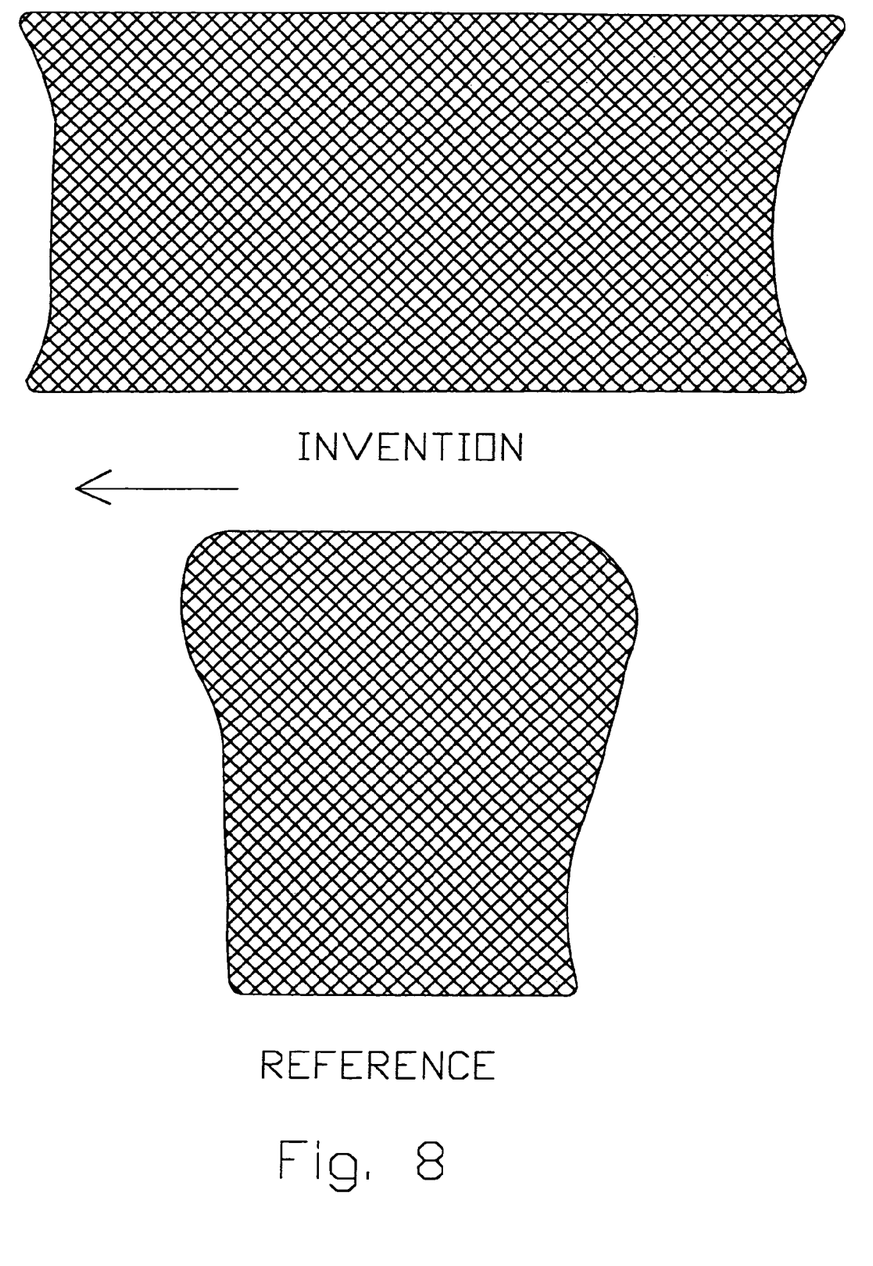
FIG. 8 shows an imprint of the contact area of the run-flat insert 300 as compared to an elastomeric insert of conventional construction.

The advantages of the run-flat insert of the invention are further appreciated by the following experimental data. FIG. 8 shows a comparison of the shape of the contact area for a molded, elastomeric insert and for the run-flat insert 200 of the invention. The molded elastomeric insert is of the type described in U.S. Pat. No. 5,891,279 issued to Lacour. The molded, elastomeric insert has an average contact pressure of about 5.2 bar. The run-flat insert 200 has a larger contact area and a contact shape that more closely resembles that of a pneumatic tire. Larger contact area gives a lower average contact pressure for a given load. Run-flat insert 200 has a lower average contact pressure of about 3.6 bar. The insert 200 has a larger, rectangular contact shape that promotes more uniform loading of the insert on the interior of the tire for better durability and resistance to impact loads.

Figure 9:
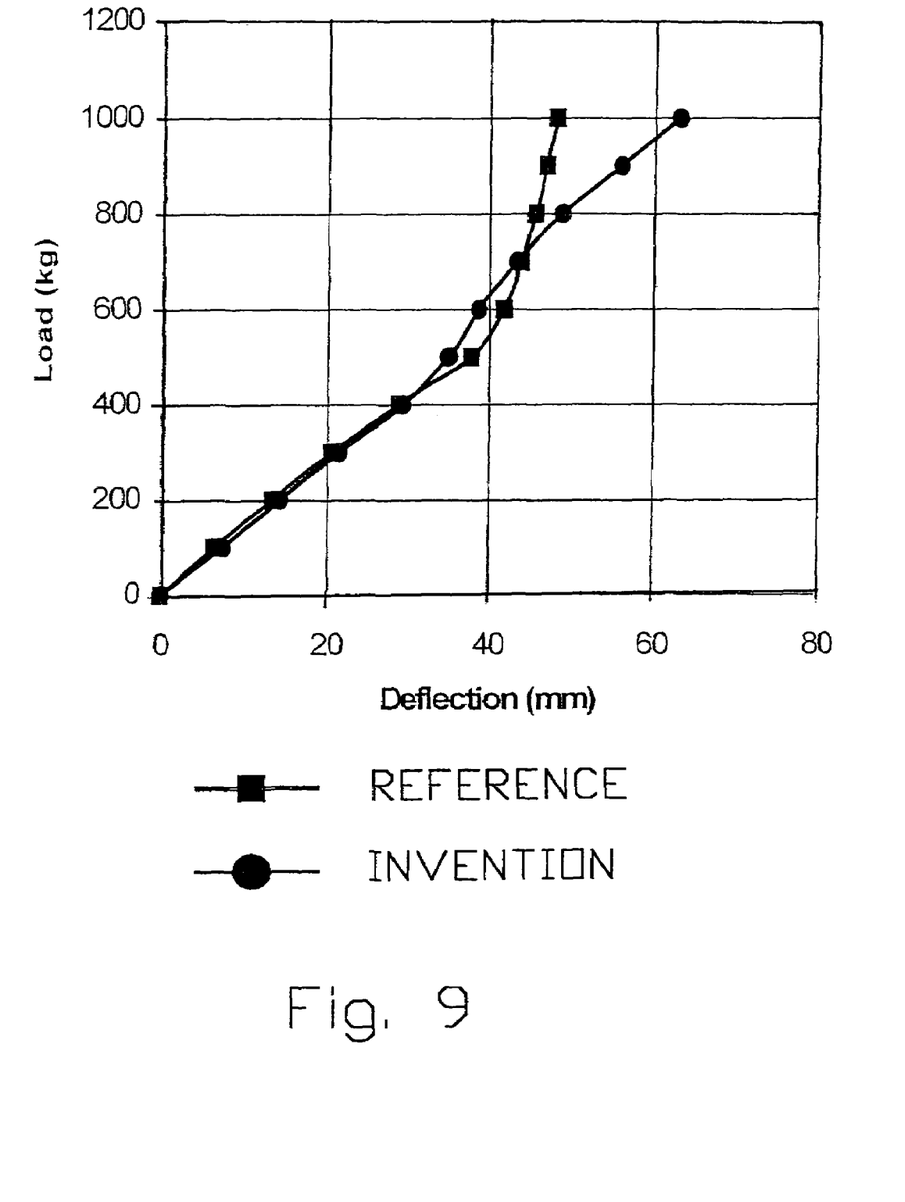
FIG. 9 shows a graph of applied load versus vertical deflection an assembly of an inflated tire, a rim, and the run-flat insert 300 as compared to an elastomeric insert of conventional construction.

The assembly comprising the insert of the invention gives deflated performance similar to when the pneumatic tire is inflated. A simple measurement of the load/deflection stiffness demonstrates this advantage. In this test, the reference insert and the insert of the invention were mounted as part of a pneumatic tire and wheel assembly. FIG. 9 shows the results of a load/deflection test where the mounted assemblies were loaded on simulated curb. The tire was inflated to 2.0 bar. The resulting vertical force was recorded as a function of the deflection of the assembly (the downward displacement of the axis of the wheel). FIG. 9 shows the curves of load versus deflection for the two inserts. As deflection increases from zero up to approximately 30–35 mm, the curves for both assemblies track the deflection of the inflated tire. As the deflection surpasses about 35 mm, tire, the insert begins to contact the interior surface of the tire. The assembly comprising the molded insert demonstrates a marked increase in the vertical stiffness of the system as shown by the rapid load increase with further deflection of the system. This rapid stiffening of the assembly comprising the elastomeric insert has the undesirable effect of forcing the vehicle suspension to accommodate any further deflection.

However, FIG. 9 clearly demonstrates that the assembly comprising the insert of the instant invention maintains a vertical stiffness that is remarkably similar to the original stiffness of the tire alone. Thus, the insert according to the invention avoids the negative effects of the undesirable impacts acting on the vehicle suspension.

Applicant understands that many other variations are apparent to one of ordinary skill in the art from a reading of the above specification. These variations and other variations are within the spirit and scope of the instant invention as defined by the following appended claims.

We claim:
1. A run-flat insert for enabling a vehicle to run on a deflated tire, mounted in an assembly comprising a pneumatic tire and a wheel rim, said insert being mounted inside the air cavity of the tire and secured to the wheel rim, said insert comprising:
   a) an elastomeric outer contacting portion for contacting the interior surface of the tire during deflated operation of the tire, and b) a reinforced annular band disposed radially inward of said outer contacting portion, wherein said band comprises an elastomeric shear layer, at least a first membrane adhered to the radially inward extent of said elastomeric shear layer and at least a second membrane adhered to the radially outward extent of said elastomeric shear layer, and c) at least one sidewall portion extending radially inward from said contacting portion for connecting said annular band to a base member fitted around the wheel rim for securing said insert to the rim, and d) at least one carcass layer adhered to said annular band, and said carcass layer extending radially inward from said annular band and anchored in said base member.

2. The run-flat insert of claim 1, wherein said carcass layer is a continuous ply having a main portion adhered to said radially inner surface of second membrane and extending between said base members.

3. The run-flat insert of claim 1, wherein said carcass layer comprises at least a discontinuous segment anchored in said base member and extending radially outward to said second membrane, and wherein said segment is adhered to an axially outermost extent of said reinforced annular band.

4. The run-flat insert of claim 1, wherein said carcass layer axially overlaps said second membrane not more than 10 mm.

5. The run-flat insert of claim 1 wherein an elastomeric wedge is adhered to the interior surface of said carcass layer in said sidewall, whereby said wedge biases said sidewall to buckle in an outward direction.

6. The run-flat insert of claim 5 wherein said wedge has a radial height of about 50 percent to about 80 percent of the height of said sidewall.

7. The run-flat insert of claim 5 wherein said wedge is positioned in said sidewall essentially midway between said first membrane and said base member.

8. The run-flat insert of claim 5 wherein said carcass layer has an axially outward displacement from a chord connecting the upper and lower extents of said wedge.

9. The run-flat insert of claim 8 wherein said displacement of said carcass layer is greater than zero and less than or equal to about 8 percent of the height of said sidewall.

10. The run-flat insert of claim 5 wherein the thickness of said sidewall at the radially innermost extent of said wedge is between about 4 percent to about 10 percent of the height of said sidewall.

11. The run-flat insert of claim 5 wherein the thickness of said sidewall at the radially uppermost extent of said wedge is between about 4 percent to about 10 percent of the height of said sidewall.

12. The run-flat insert of claim 5 wherein the thickness of said wedge is between about 4 percent to about 10 percent of the height of said sidewall.

13. The run-flat insert of claim 1 wherein said sidewall has a linear stiffness in tension of at least 100 daN/mm.

14. The run-flat insert of claim 1 wherein said base member has a reinforcement material having a tensile modulus of at least about 100 GPa and a tensile yield strength of at least about 10 GPa.

15. The run-flat insert of claim 14 wherein said base member has a monolithic reinforcement having a width of at least about 5 percent of a maximum section width of said insert and a height of about 50 percent of said width of said reinforcement.

16. The run-flat insert of claim 14 wherein each of said base member has reinforcing cores arranged in a three-layer stack having a 4-wire by 3-wire by 2-wire configuration of wires having a diameter of about 1 mm.

17. The run-flat insert of claim 14 wherein each of said base member has reinforcing cores arranged in a three-layer stack having a 3-wire by 2-wire by 1-wire configuration of wires having a diameter of about 1 mm.

18. The run-flat insert of claim 1 wherein a ratio of the longitudinal tensile modulus of each of said membranes to the shear modulus of said shear layer is at least 100:1.

19. The run-flat insert of claim 18, wherein each of said membranes comprises at least one layer of essentially circumferentially oriented cord reinforcements.

20. The run-flat insert of claim 18, wherein each of said membranes comprises at least two layers of mutually oblique cord reinforcements, and said cord reinforcements fours an angle with the tire circumferential direction of between about 10 degrees and about 20 degrees.

21. The run-flat insert of claim 1, wherein said elastomeric shear layer has a thickness between about 4 mm and about 20 mm.

22. The run-flat insert of claim 1, wherein said elastomeric shear layer has a shear modulus of elasticity of between about 3 MPa and about 20 MPa.

23. The run-flat insert of claim 22, wherein said elastomeric shear layer has a tangent delta of less than or equal to about 0.1.

24. The run-flat insert of claim 1, wherein the product of the shear modulus of elasticity of said shear layer times the radial thickness of said shear layer divided by the radius of the outermost extent of said second membrane is between about 2 bar and about 6 bar.

25. The run-flat insert of claim 24, wherein the product of the shear modulus of elasticity of said shear layer times the radial thickness of said shear layer divided by the radius of the outermost extent of said second membrane is about 3 bar.

26. The run-flat insert of claim 1, wherein said insert has a maximum width between about 50 percent to about 70 percent of the tire section width.

27. The run-flat insert of claim 1, wherein said insert has a section height between about 40 percent to about 60 percent of the section height of the tire.

* * * * *